Patented Aug. 25, 1925.

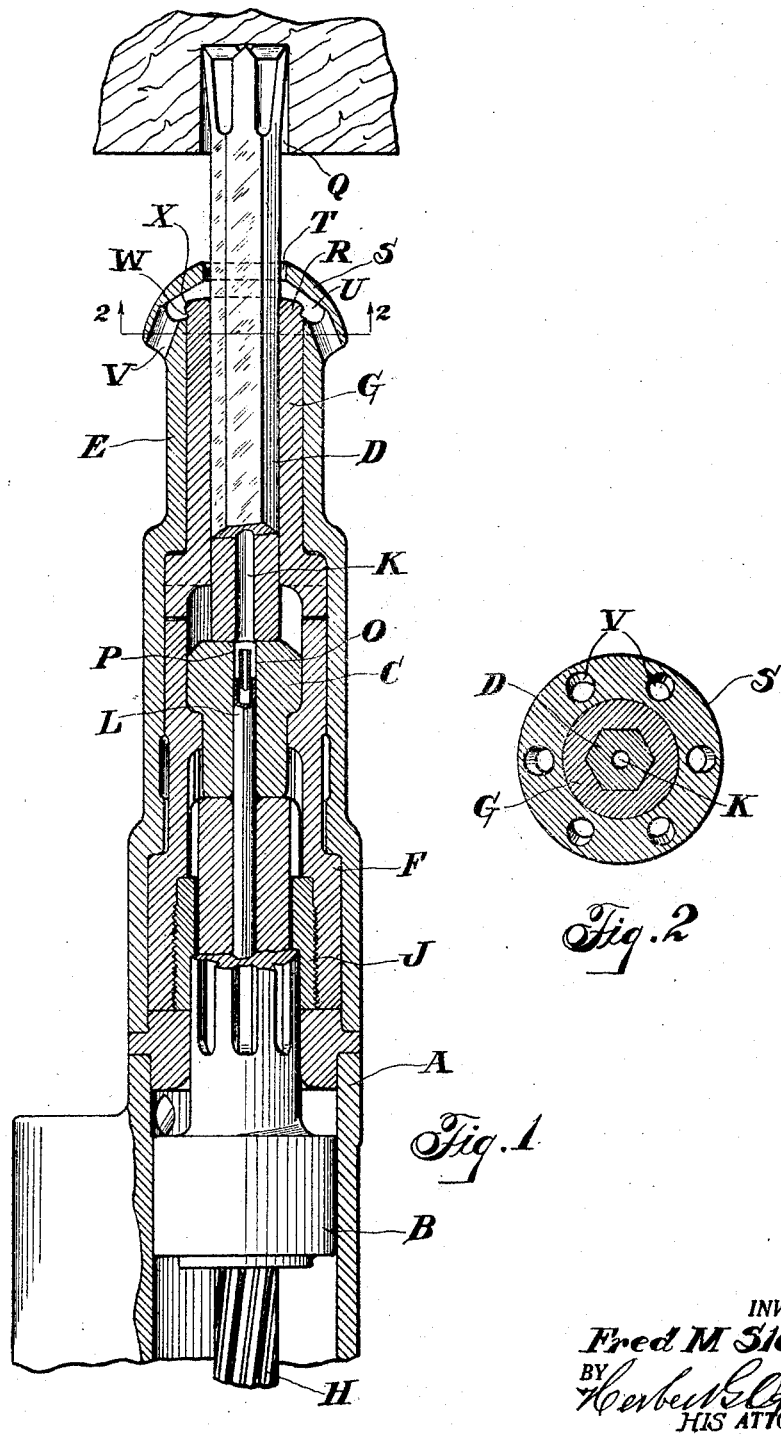

1,551,062

UNITED STATES PATENT OFFICE.

FRED M. SLATER, OF EASTON, PENNSYLVANIA, ASSIGNOR TO INGERSOLL-RAND COMPANY, OF JERSEY CITY, NEW JERSEY, A CORPORATION OF NEW JERSEY.

ROCK DRILL.

Application filed August 12, 1924. Serial No. 731,553.

*To all whom it may concern:*

Be it known that I, FRED M. SLATER, a citizen of the United States, and a resident of Easton, county of Northampton, State of Pennsylvania, have invented a certain Rock Drill, of which the following is a specification accompanied by drawings.

This invention relates to rock drills and more particularly to the construction of the front head.

In the operation of the stope drill, water from the hole being drilled runs down the drill steel and on reaching the larger diameter chuck or other revolving parts is ordinarily caused to spray about by centrifugal force. This spraying is annoying to the operator and interferes with proper control of the drill.

One object of the invention is to prevent spraying of the water. This is accomplished in the preferred embodiment of this invention by providing means formed integrally with the front head to receive the spray and discharge it downwardly.

Further objects of the invention will be in part obvious and in part pointed out in the following description taken in conjunction with the accompanying drawings in which, Figure 1 is a longitudinal sectional view of the forward part of a stope drill embodying a preferred form of the invention, and Figure 2 is a cross section of the front head and the shroud for deflecting the spray, taken along the lines 2—2 looking in the directions of the arrows;

Referring to the drawings, A represents the cylinder of a stope drill within which there is disposed a hammer piston B for delivering blows to an anvil block C contacting with the drill steel D. The cylinder is provided with a front head E which supports a chuck F in dovetailed relation with a chuck front bushing G which is adapted to engage the shank of the drill steel D by which the latter is rotated. Rotation is produced by means of a rifle bar H cooperating with the hammer piston B. The nose of the hammer piston B is fluted to engage the chuck nut J suitably mounted in the chuck F. Air and water under pressure are supplied to the hollow bore K of the drill steel D by means of an air tube L and a water tube O extending through the piston B into a bore P in the anvil block C in alignment with the bore K of the steel. The control of the air and water thus supplied is independent of the control of the air operating the piston B.

In operating a drill of this type, water is forced from the bit end of the drill steel D to clear the hole Q being drilled and chips and muddy water run down the outside of the steel usually onto the drill especially on the front head E. Such water as is not thrown off by centrifugal force from the outside of the drill steel D may reach the end R of the chuck front bushing G which usually extends slightly beyond the main portion of the front head E. Since the chuck front bushing is somewhat larger than the diameter of the steel D, the centrifugal force is also somewhat greater and from this point usually the water is sprayed out sidewise to the annoyance of the operator.

In order to prevent this spraying, means are provided to collect the water thrown from the end R of the chuck front bushing and to cause it to flow downwardly without being unnecessarily sprayed about. To this end there is provided a shroud S formed as an integral part of the front head E and inclosing the end R of the chuck front bushing. The shroud S is provided with an aperture T of suitable diameter to allow plenty of clearance of the steel D and to allow the water to pass into the chamber U formed therewithin. The water thrown from the end R of the chuck front bushing is received in the chamber U and passes out to atmosphere through a plurality of holes V extending into the chamber U in a direction generally longitudinal with respect to the drill. The water is thus projected downwardly in streams which the operator may easily avoid by standing at a slight distance from the drill.

In order to insure that all the water will be thrown off at the very end of the chuck front bushing G and not find its way into the interior of the drill between the chuck front bushing G and the front head E, an annular groove W is cut near the end R of the chuck front bushing forming an annular bead X. The chuck front bushing being of smaller diameter at the groove W, the tendency of the water is to be thrown off at the bead rather than enter the groove W which acts therefore as a check.

I claim:

1. A rock drill, a cylinder, a hammer piston within the cylinder, a front head for the cylinder, a rotatory chuck adapted to receive a drill steel within the front head, and means integral with the front head to receive mud and water flowing down the drill steel and from the chuck end to discharge such mud and water downwardly, including a shroud inclosing the front end of the chuck and provided with discharge holes extending in a rearward direction with respect to the rock drill.

2. A rock drill comprising a cylinder, a hammer piston within the cylinder, a front head for the cylinder, a chuck within the front head adapted to receive a drill steel, said chuck being grooved at its end to form a bead from which water and mud is adapted to be thrown, and means formed integrally with the front head to receive mud and water flowing down the drill steel and from the chuck, and to discharge such mud and water downwardly.

3. A rock drill, a cylinder, a hammer piston within the cylinder, a front head for the cylinder, a rotatory chuck adapted to receive a drill steel within the front head, said chuck being grooved at its end to form a bead from which water and mud is adapted to be thrown, and means integral with the front head to receive mud and water flowing down the drill steel and from the chuck end to discharge such mud and water downwardly, including a shroud inclosing the front end of the chuck and provided with discharge holes extending in a rearward direction with respect to the rock drill.

In testimony whereof I have signed this specification.

FRED M. SLATER.